US008399792B2

(12) United States Patent
Peters et al.

(10) Patent No.: US 8,399,792 B2
(45) Date of Patent: Mar. 19, 2013

(54) WELDING DEVICE AND METHOD

(75) Inventors: Steven R. Peters, Huntsburg, OH (US); Michael S. Flagg, Aurora, OH (US); Greg McCall, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 897 days.

(21) Appl. No.: 12/493,815

(22) Filed: Jun. 29, 2009

(65) Prior Publication Data
US 2010/0326963 A1    Dec. 30, 2010

(51) Int. Cl.
*B23K 9/04*    (2006.01)
(52) U.S. Cl. ................................. 219/76.14; 219/76.1
(58) Field of Classification Search .............. 219/90, 219/60 R, 55–56, 61.6, 69.1, 78.01, 86.1, 219/87, 121.45, 121.53, 121.54, 21.63, 127, 219/136, 137.2, 141, 159
See application file for complete search history.

(56) References Cited

U.S. PATENT DOCUMENTS

| | | | |
|---|---|---|---|
| 2,191,469 A | | 2/1940 | Hopkins |
| 2,868,956 A | * | 1/1959 | Lobosco ................... 219/137 R |
| 2,929,915 A | * | 3/1960 | Taylor et al. ................ 219/89 |
| 3,019,327 A | | 1/1962 | Engel |
| 3,342,973 A | * | 9/1967 | Smith et al. ................ 219/137 R |
| 3,624,345 A | * | 11/1971 | Armstrong ................ 219/76.14 |
| 4,027,135 A | | 5/1977 | Barger |
| 4,302,655 A | | 11/1981 | Edling |
| 4,375,024 A | * | 2/1983 | Hayakawa et al. ............ 219/56 |
| 4,539,460 A | | 9/1985 | Herrmann et al. |
| 4,782,206 A | | 11/1988 | Ayres et al. |
| 4,902,873 A | * | 2/1990 | Ivannikov ................ 219/137 R |
| 4,952,769 A | | 8/1990 | Acheson |
| 5,260,540 A | * | 11/1993 | Kamimura et al. ........ 219/76.14 |
| 5,714,735 A | | 2/1998 | Offer |
| 6,069,334 A | | 5/2000 | Capitanescu |
| 6,884,959 B2 | | 4/2005 | Gandy et al. |
| 2008/0011728 A1 | | 1/2008 | Peters et al. |

FOREIGN PATENT DOCUMENTS

| | | |
|---|---|---|
| EP | 1645353 A2 | 4/2006 |
| JP | 62212070 | 9/1987 |
| WO | 2010112068 | 10/2010 |

* cited by examiner

*Primary Examiner* — Henry Yuen
*Assistant Examiner* — Thomas Ward
(74) *Attorney, Agent, or Firm* — Shannon V. McCue; Hahn Loeser & Parks LLP

(57) ABSTRACT

A welding device includes an electrode head adapted to concurrently house an array of associated multiple, continuous-feed electrodes in a spaced apart configuration for concurrently depositing cladding material on the surface of a workpiece. The electrode head may be actuatable through a welding trajectory. The welding device may also include a welding power source adapted to provide power for simultaneously establishing a welding arc between each of the multiple, continuous-feed electrodes and the workpiece.

15 Claims, 14 Drawing Sheets

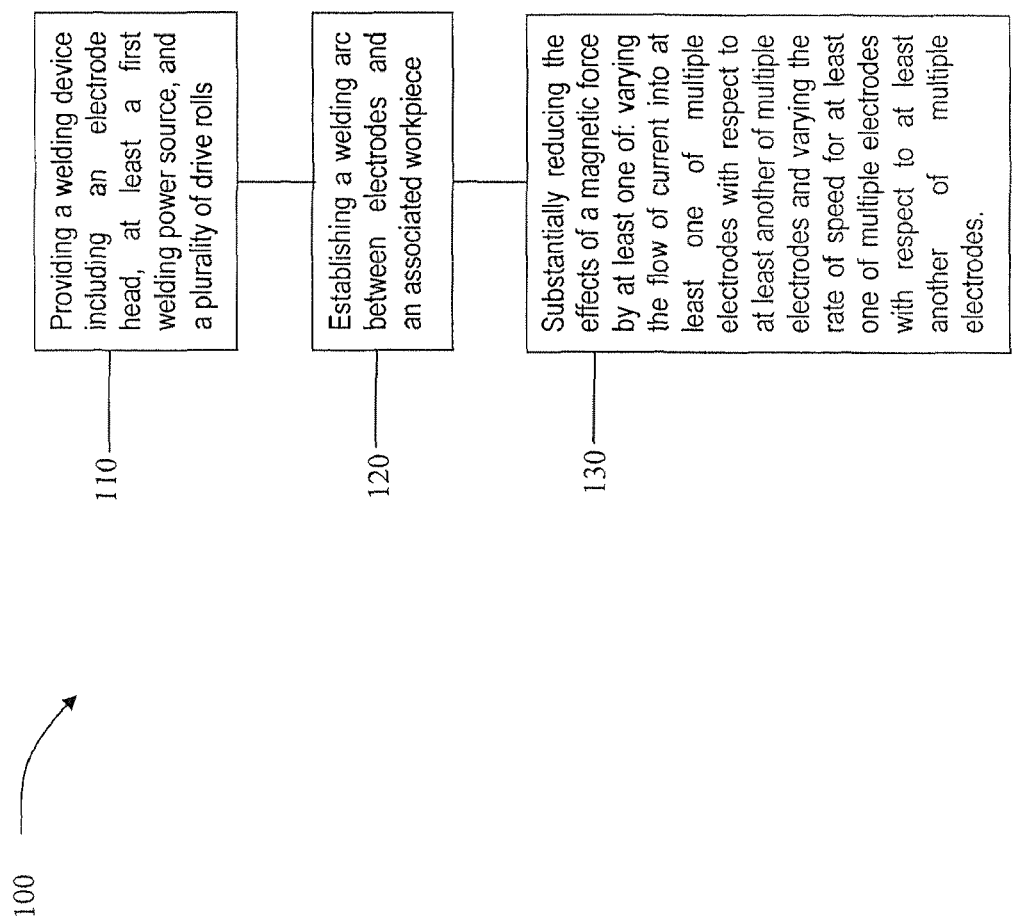

WELDING DEVICE AND METHOD

TECHNICAL FIELD

The present disclosure is related to welding, and more particularly, to a welding device and method for cladding a workpiece.

BACKGROUND OF THE INVENTION

Metal parts frequently fail their intended use, due not only to fracturing but also to wear and abrasion, including mechanical wear (abrasion and pressure), chemical corrosion, and/or heat. Wear changes a metal part dimensionally and as such functionally. Processes are known for repairing worn metal parts where a durable material is adhered to the degraded surface. Similarly, a durable material may be adhered to a not previously worn surface which may be expected to experience wear. For metal components, this is commonly known as cladding or hard-facing, which can be defined as the application of building up wear-resistant material onto a part's surface by means of welding or joining. The cost of cladding is considerably less expensive than replacement costs and since cladding can be applied to a variety of base metals like: steel, stainless steel, nickel-based alloys, and copper-based alloys, it is widely used throughout industry today.

Previous methods and systems for cladding use a single electrode having a diameter sufficiently large to deposit cladding material at a cost effective rate. However, this typically results in deeper penetration and higher admixture. Other systems use strip cladding, which is inflexible and not applicable for use with a wide range of alloys. Moreover, the strip electrodes are costly to manufacture and use.

BRIEF SUMMARY

In one embodiment, a welding device comprises an electrode head adapted to concurrently house an array of associated multiple, continuous-feed electrodes in a spaced apart configuration for concurrently depositing cladding material on the surface of an associated workpiece. The electrode head may be actuatable through a welding trajectory. The welding device also comprises a welding power source adapted to provide power for simultaneously establishing a welding arc between each of the associated multiple, continuous-feed electrodes and the associated workpiece and means for concurrently driving the array of associated multiple, continuous-feed electrodes through the electrode head.

BRIEF DESCRIPTION OF THE DRAWINGS

FIG. 11 is a process flow diagram of a method of cladding.

DETAILED DESCRIPTION OF THE INVENTION

Figure 1:
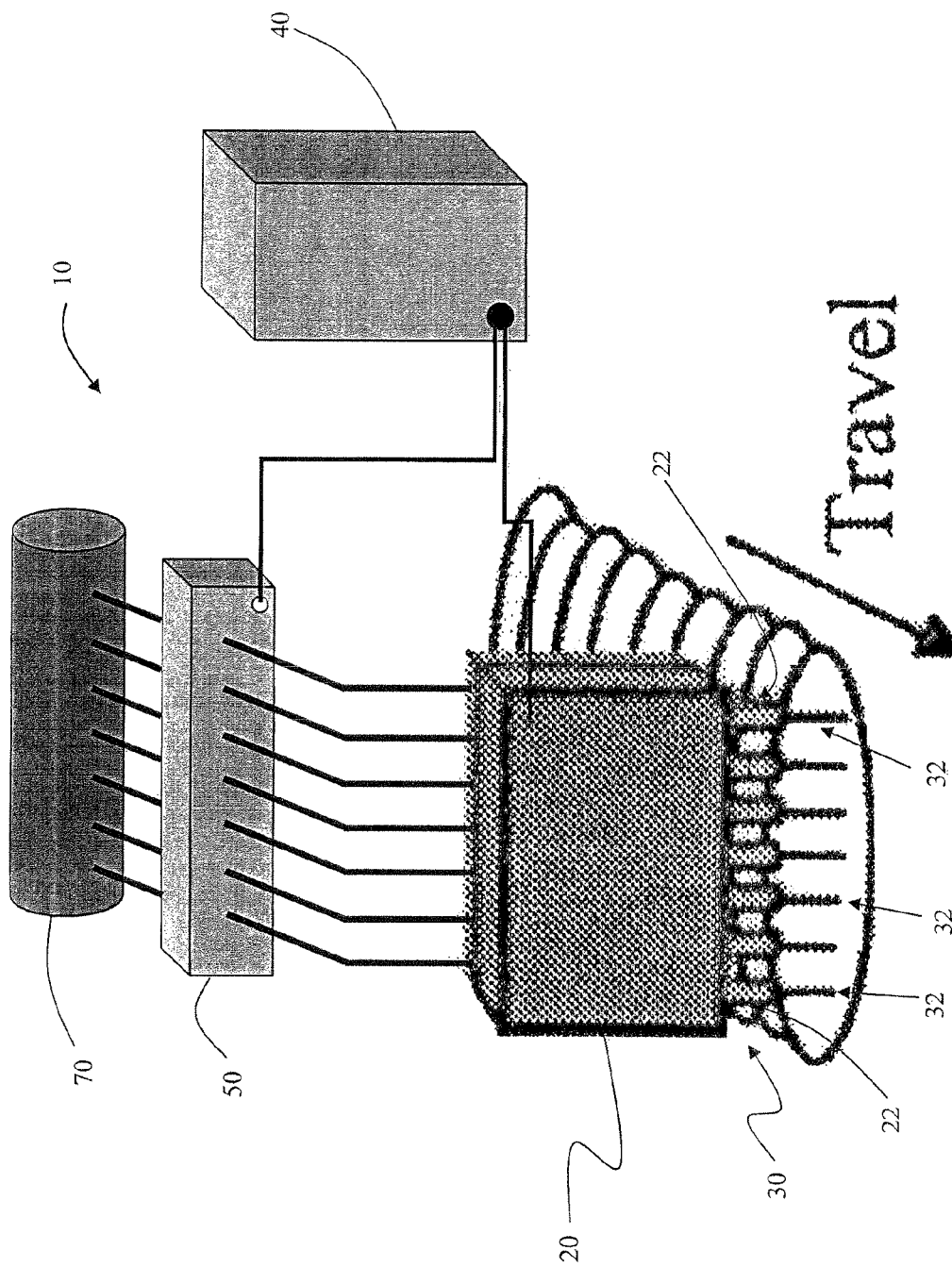
FIG. 1 is a perspective view of a welding device.

Referring now to the drawings wherein the showings are for purposes of illustrating embodiments of the invention only and not for purposes of limiting the same, FIG. 1 shows a welding device depicted generally at 10. It is envisioned that device 10 may typically be used to clad or hard-face a workpiece by a submerged arc or electroslag welding process, although other welding processes such as GMAW, FCAW, TIG, and laser welding may also be employed.

Cladding or hard-facing may be defined as a process by which cladding material is adhered to the surface of an existing component, known as a substrate or workpiece. The process bonds or infuses the cladding material or filler wire, which may be harder than the component material. In this manner, the cladding material comprises a wear resistant surface and a barrier to abrasion, erosion and heat during use.

Welding device 10 may include an electrode head 20, which may be adapted to concurrently house an array 30 of multiple, continuous-feed electrodes 32. Electrodes 32 may be gas-shielded, self-shielded, or metal cored. These electrodes may be solid core, metal core, or flux cored wires, to be used under gas shielding, under a submerged arc flux, or in an electroslag process. In the instance of cored electrodes, it is contemplated that the electrode sheath may be carbon steel, stainless steel, or a nickel alloy. Electrodes 32 may be provided on a coil 70. Coil 70 may include a plurality of individual coils, each coil containing a single electrode, which are arranged along a common axis of rotation. Still any manner of delivering filler wire or cladding material may be chosen without departing from the intended scope of coverage of the embodiments of the subject invention.

Figure 2:
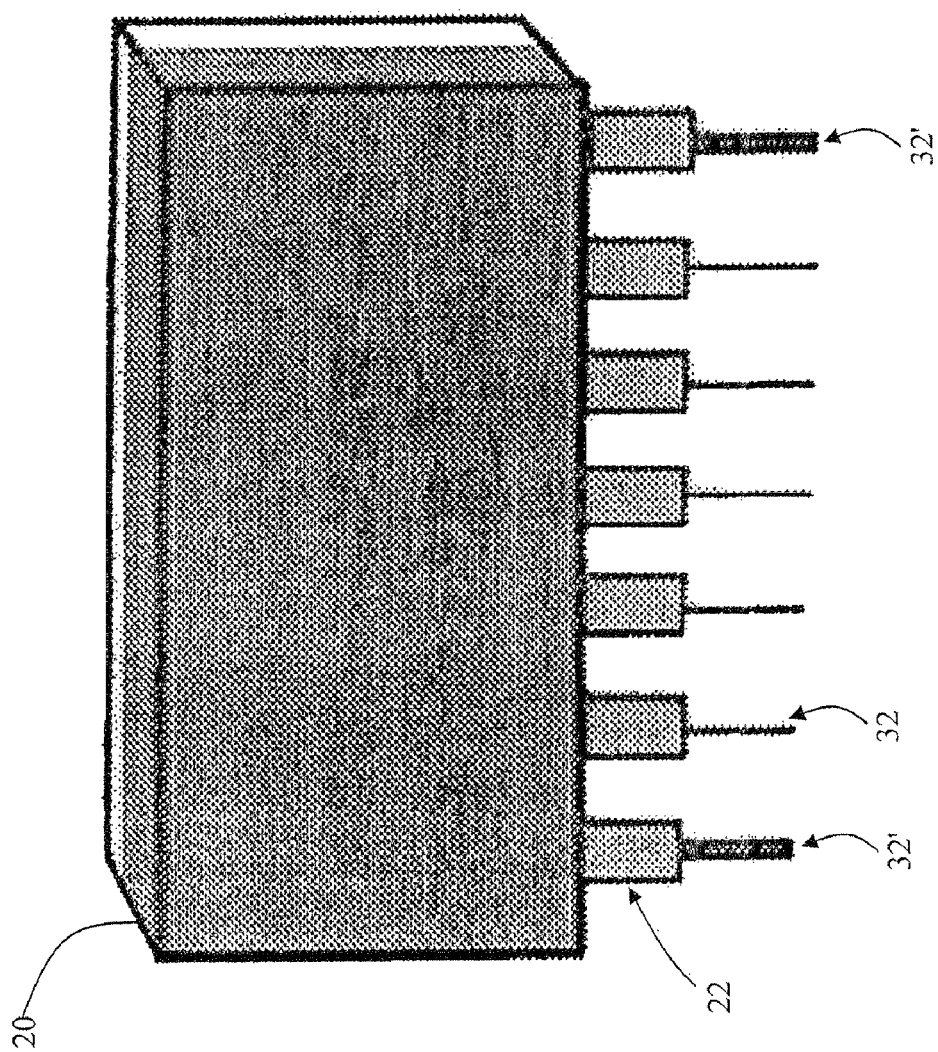
FIG. 2 is a perspective view of an embodiment of an electrode head.

Typically in prior systems and methods, workpieces are clad using strip electrodes or by one or two electrodes in combination with a head oscillator, which moves the weld head back and forth across the workpiece to increase the width of the cladding material. A strip electrode may typically be 45-120 mm wide and 0.5 mm thick, while the individual electrodes typically used in a head oscillator have diameters greater than 3/32 of an inch. Turning back to the subject disclosure, the diameter of electrodes 32, in contrast to the prior art, may be less than 1/16 of an inch. More specifically, electrodes 32 may range between about 0.020 and 0.060 inches. Yet more specifically, the diameter of electrodes 32 may be about 0.045 inches. As shown in FIG. 2, the plurality of electrodes 32 may include electrodes having substantially differing diameters. For example, electrodes 32 nearer the center of electrode head 20 may be 0.020 inch or 0.035 inch in diameter, while electrodes 32' nearer the outside of electrode head 20 may be 0.045 inches in diameter. Larger diameter wires may melt off at higher current levels than smaller diameter wires, and such an arrangement may force more heat produced by the current to the edge of the molten cladding material deposit.

Further, the diameter of electrodes 32 may impact the amount of current applied to the electrodes. For example, an array having six 0.045 inch diameter electrodes may be powered by a 600 amp current, while a similar array of six 0.035 inch diameter electrodes may be powered by a 450 to 500 amp current. In such an example using 0.035 inch diameter electrodes, it may be necessary to increase the wire feed, that is the rate at which the electrode is fed to the electrode head 20, to maintain a deposition rate approximately the same as when using a 0.045 inch diameter. However, in such an example, the admixture penetration, that is, the mixture of the cladding material with the molten workpiece, and associated depth thereof below the original surface of the workpiece, may be observed to decrease as opposed to an application wherein a 0.045 inch diameter electrode is utilized.

Electrode head 20 may be adapted to receive a plurality of electrode contact tips 22. Each of the contacts tips 22 may be associated with one of the electrodes 32. In one embodiment, the number of electrodes 32 and corresponding electrode tips 22 may range from between two (2) and 15. More specifically, the number of electrodes may be seven (7). However, use of electrodes in excess of 15 may be incorporated as is appropriate for a particular application. In fact, the number of adjacently positioned electrodes is limited only by the practical size of the electrode head 20 and/or the dimensions of the workpiece 51. In one aspect, contact tips 22 may be selectively positionable within electrode head 20, such that the distance each contact tip 22 extends from electrode head 20 may be customized. For example, contact tips nearer the center of electrode head 20 may extend closer to the workpiece than contact tips nearer the outside of electrode head 20. Such an arrangement may allow the edges of the weld pool to be cooler relative to the center of the weld pool. Persons of skill in the art will readily see that various other heat-disparate patterns may be achieved without departing from the intended scope of coverage of the embodiments of the subject invention. In another aspect, contact tips 22 may be provided in multiple lengths. More specifically, one contact tip may be longer than another as another method of varying the distance between the contact tips 22 and the workpiece 51. Stated differently, the distance from the end of the contact tip 22 to the workpiece 51 may vary for individual electrodes 22.

The contact tips 22 may be releasably secured to the electrode head 20. In one embodiment, the electrode head 20 may include apertures adapted to securely receive each of the contact tips 22 respectively. In one exemplary manner, the apertures may be threaded. The contact tips 22 may be correspondingly threaded for insertion into and removal from the electrode head 20 as needed. In one embodiment, set screws may also be included that when tightened prevent the contact tips 22 from unintentionally dislodging. Still, other means for affixing the contact tips 22 with respect to the electrode head 20 may be chosen with sound engineering judgment.

Figure 3A:
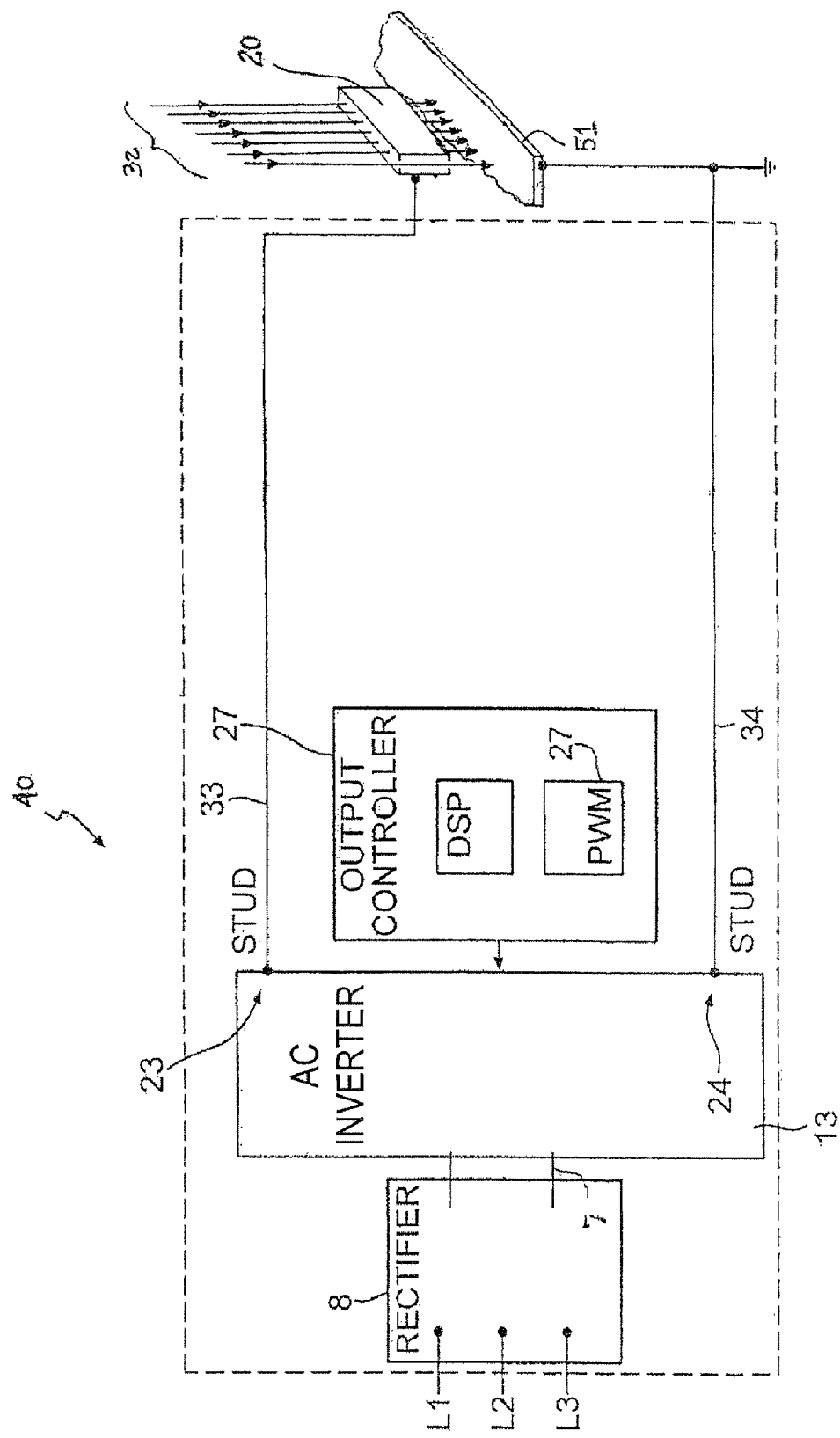
FIG. 3A is a schematic representation of an exemplary welding power supply.
Figure 3B:
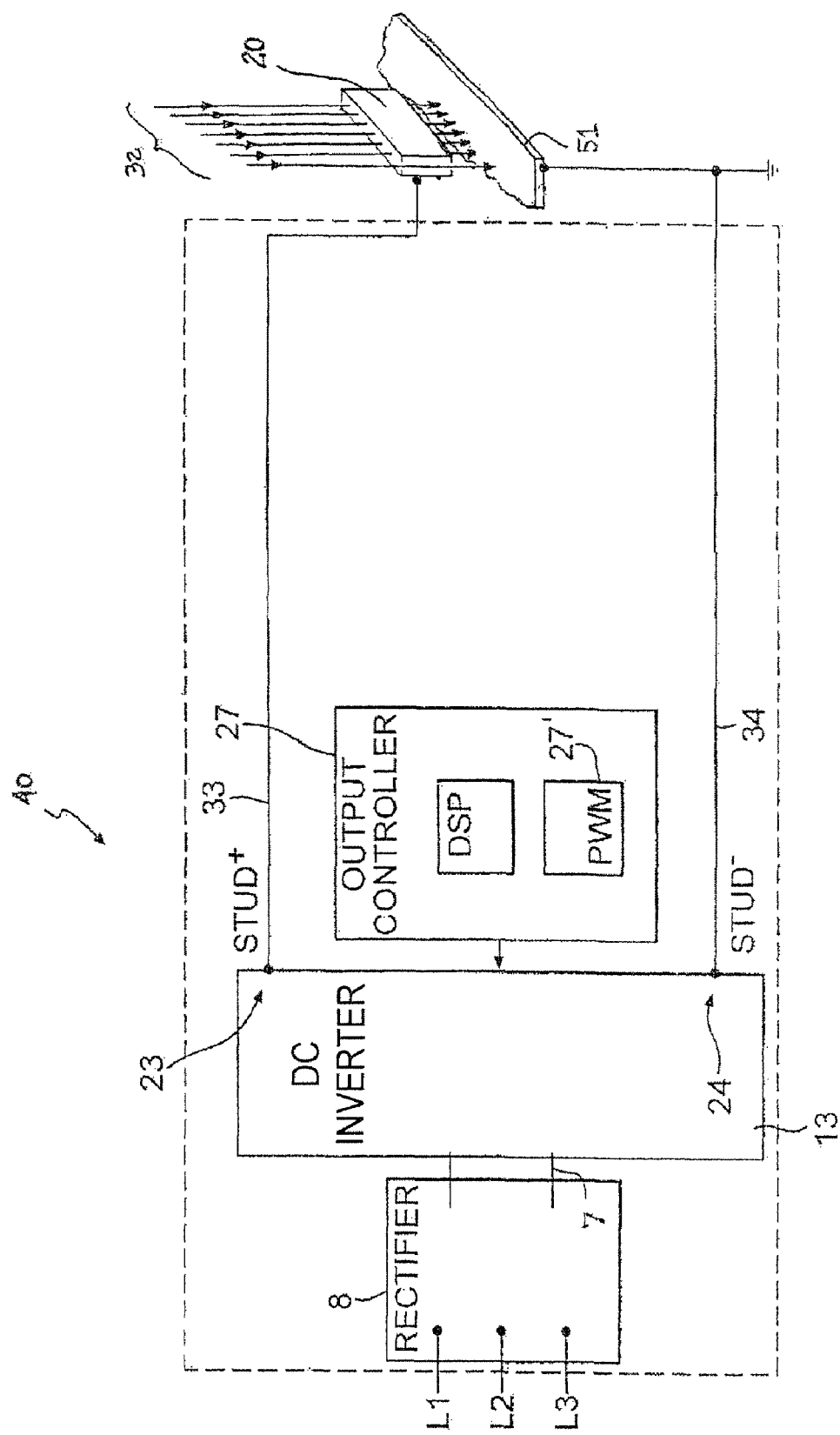
FIG. 3B is a schematic representation of an exemplary welding power supply.

Referencing FIGS. 3 and 3a, welding device 10 may further include a welding power source 40 as is known in the art, and which described hereafter, is exemplary in nature. One power source that may be used is the Power Wave® power supply manufactured by The Lincoln Electric Company in Cleveland, Ohio. In the current embodiment, three phase power, shown by input power lines L1, L2 and L3, is directed to a power source rectifier 8 that produces a DC signal through conductors 7, of which the DC signal may be further directed to the input of an inverter 13. In one embodiment, the inverter 13 includes a transformer having primary and secondary windings in a manner well known in the art. Output from the secondary windings may be directed to a rectifier providing positive and negative supply power to power output terminals 23, 24, respectively, also referred to as studs 23, 24 for delivering DC power to the electrodes 32 received within the electrode head(s) 20. The power source 40 may further include a power output controller 27 electrically communicated to the rectifier for gauging or controlling output power at the studs 23, 24 during the welding or cladding process. In one embodiment, the controller 27 may include a pulse wave modulator 27' or PWM 27'. Welding cables 33, 34 may be connected to the power supply 40, and more specifically to the studs 23, 24, for delivering welding current to a work piece 51 through the electrodes of the electrode head 20.

Alternative embodiments envision the use of welding device 10 having a power source 40 that delivers AC power. In a similar manner, input power lines L1, L2 and L3 deliver power to a rectifier, which steps the voltage up/down to the appropriate levels. However, in this embodiment, the output controller 27 controls the output to generate an AC signal or any AC waveform suitable for use with the embodiments of the subject invention.

Figure 4:
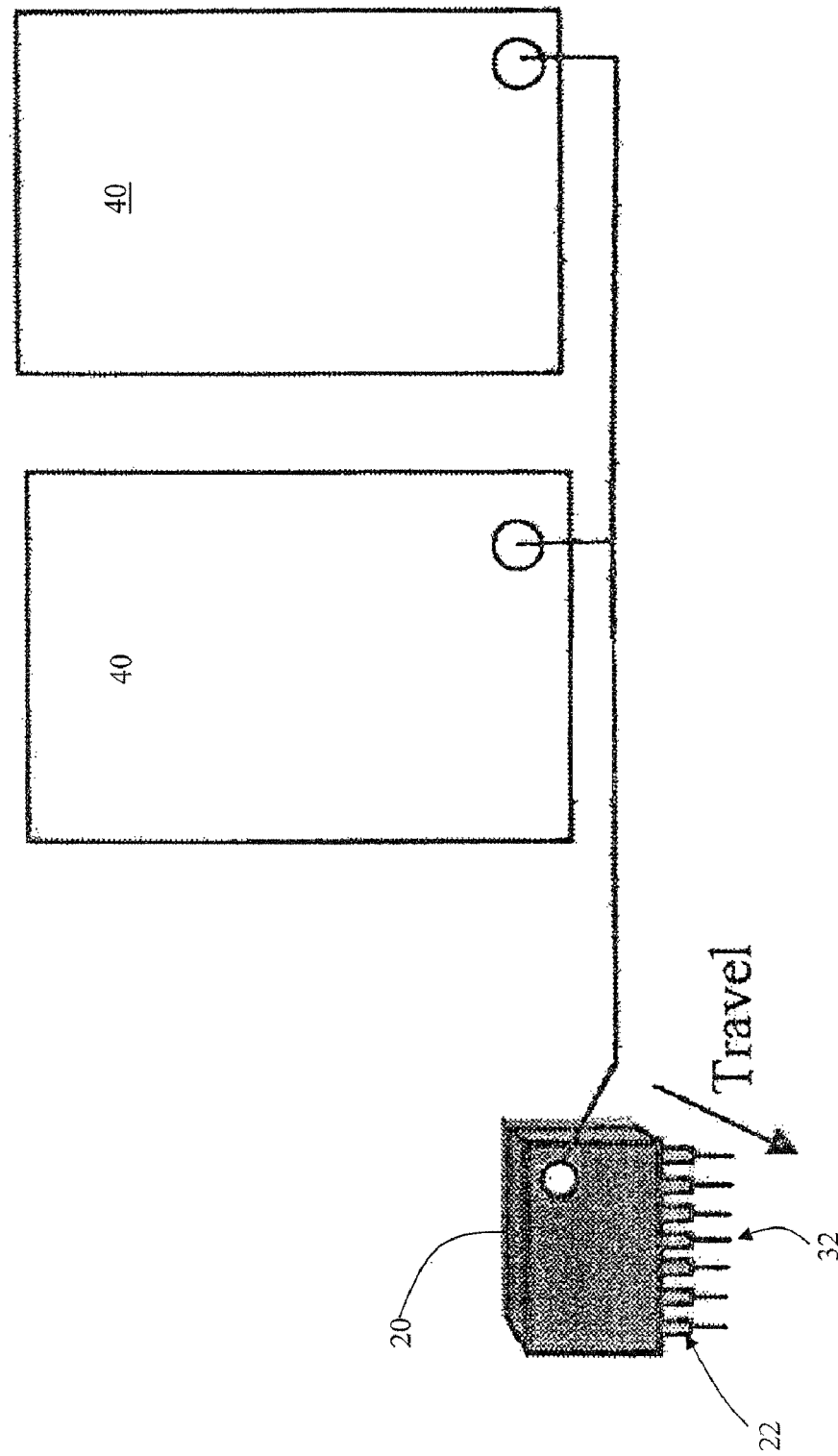
FIG. 4 is a perspective view of another embodiment of a welding device.

In one embodiment, welding device 10 may include a single power source for applications in which current less than, for example, about 1000 amps may be utilized. However, in applications in which current in excess of, for example, about 1000 amps may be utilized, multiple power sources 40 may be connected in parallel as shown in FIG. 4 to provide the requisite current to welding device 10. Of course, persons of skill in the art will readily see both DC and/or AC type power sources 40 may be connected in the aforementioned manner.

Figure 5:
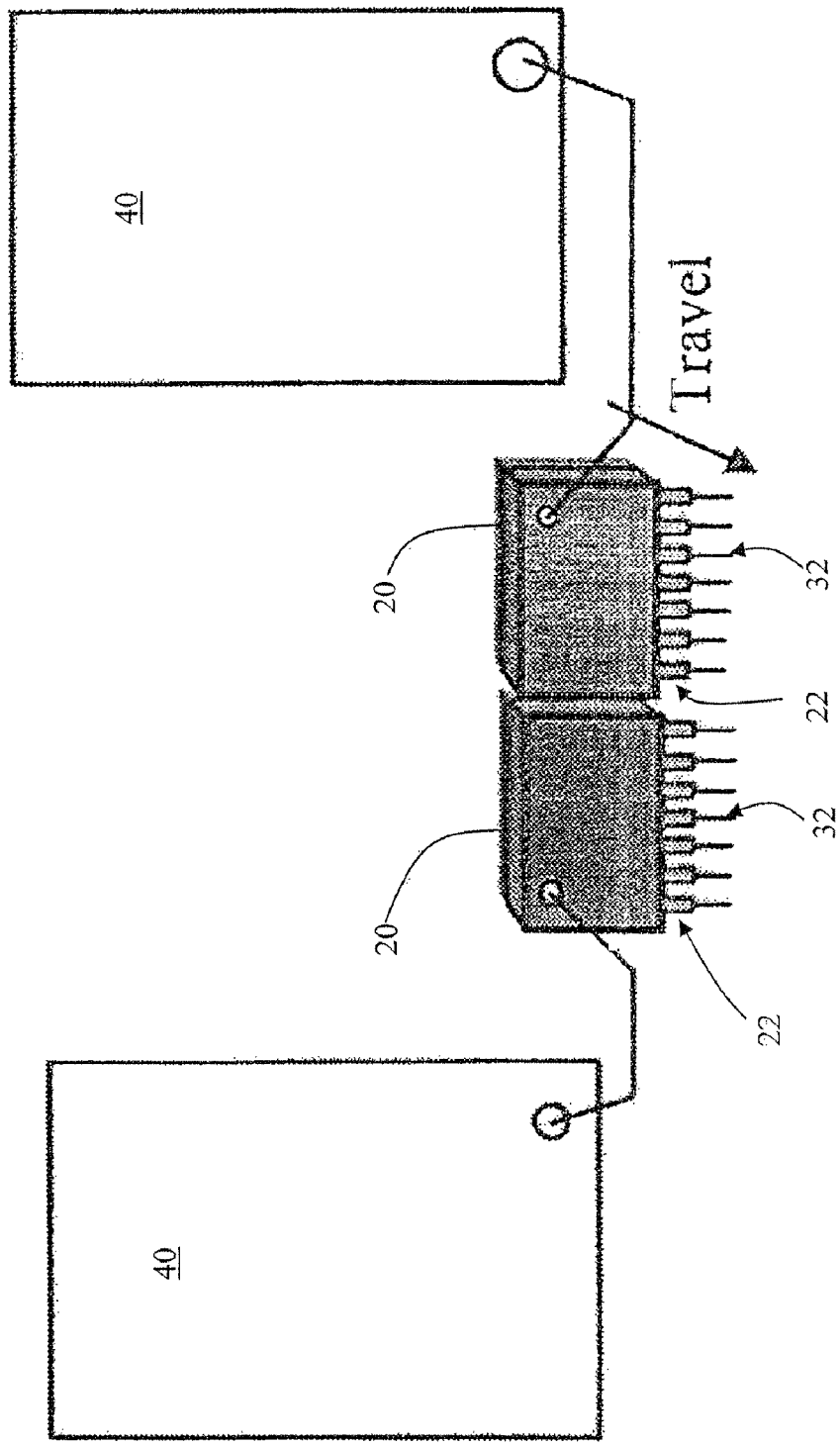
FIG. 5 is a perspective view of another embodiment of a welding device.

In another embodiment shown in FIG. 5, at least two electrode heads 20 may be arranged substantially next to each other, perpendicular to the path of the welding trajectory, to provide for a wider deposition of cladding material. In such an embodiment, it is envisioned that each electrode head 20 may be connected to a separate power source 40. However, it is also contemplated that a single power source 40 may power more than one electrode head 20, depending on the power requirements of the cladding operation.

Figure 6:
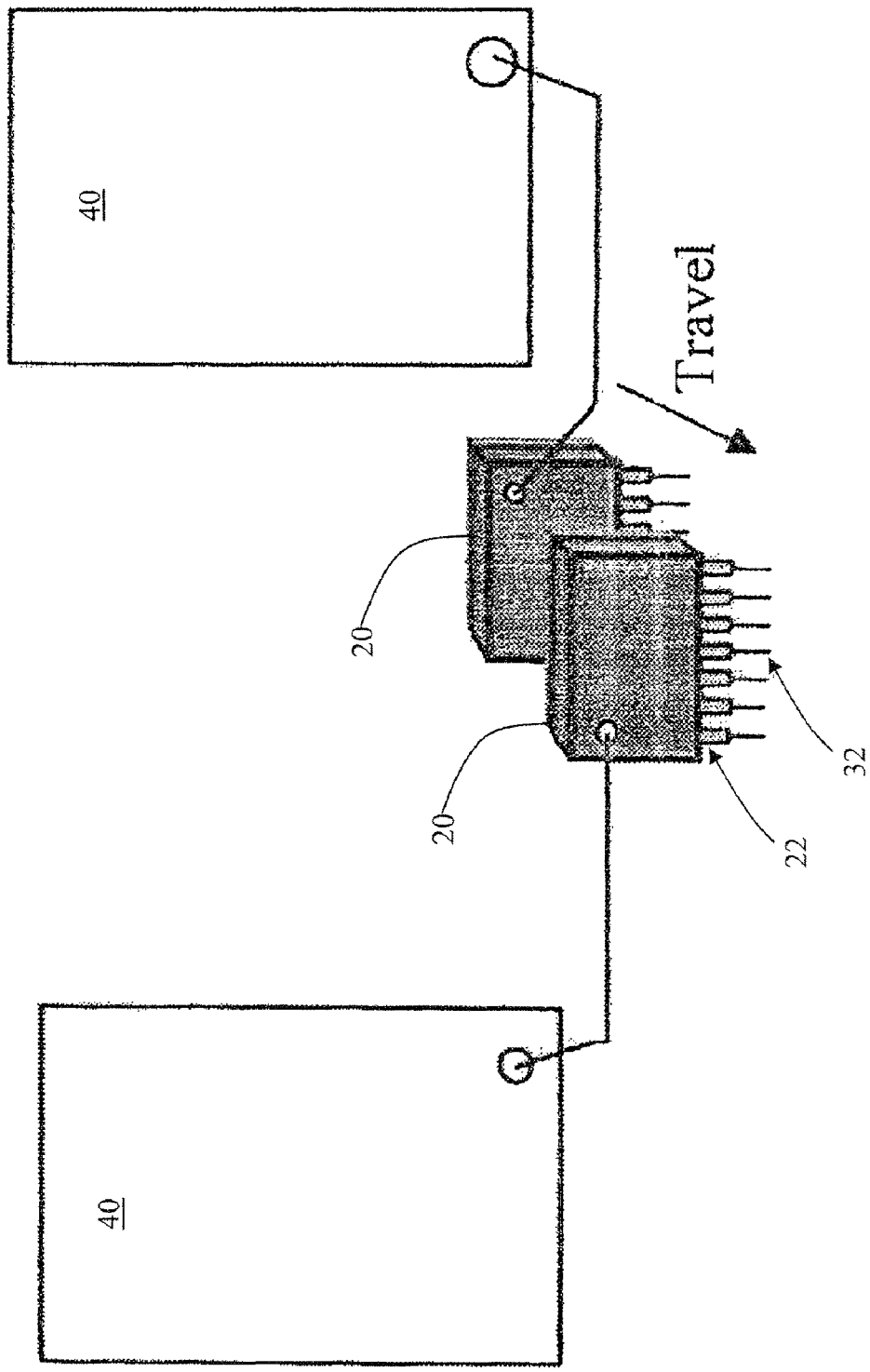
FIG. 6 is a perspective view of another embodiment of a welding device.

In still a further embodiment shown in FIG. 6, at least two electrode heads 20 may be provided where a first electrode head is positioned substantially in front of a second electrode head to increase the deposition of cladding material over the same workpiece area. Such an arrangement may increase productivity by reducing the number of cladding passes made by a single electrode head.

Referring again to FIG. 1, welding device 10 may in addition include means for concurrently driving the array 30 of electrodes 32 through the electrode head 20. It is envisioned that the means for driving may include a plurality of drive rolls 50 or other wire feeder device. Each of the plurality of drive rolls 50 may be associated with one or more of the electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in a cladding process without departing from the intent of the subject disclosure. In one example, drive rolls 50 may be configured to drive electrodes 32 through the electrode head 20 at substantially the same rate. Alternatively, drive rolls 50 may be configured to feed electrodes 32 at slower and/or faster wire speeds/wire feed rates, where it may be desired to change the current needed to melt off the electrode, thereby changing the heat input by electrode 32 into the molten cladding material. For example, one set of drive rolls 50 may be configured to feed electrodes 32 arranged at the outside of array 30 at a one wire feed speed, while a different set of drive rolls 50 may be configured to feed electrodes 32 arranged at the inside of array 30 at a relatively lower wire feed speed as compared to the wire feed speed of the outer electrodes, so as to substantially reduce and/or eliminate the effects of the magnetic force induced by the flow of current through each electrode 32.

In one aspect of the embodiments of the subject invention, each of the electrodes 32 may be configured to be connected to the welding power source 40 having the same voltage potential. That is to say that during the cladding process welding power is delivered through each of the electrodes 32 in the array at substantially the same rate. Accordingly, cladding material is delivered substantially uniformly over the width of the electrode head 20. Uniform penetration of the substrate is also achieved. As indicated above, power may be delivered from the welding power source 40 through welding cables 33, 34 as attached at one end to studs 23, 24. At the distal end, welding cables 33, 34 may be connected to the electrode head 20 through an electrode head connector. In the exemplary case of a single welding power source 40, a single electrode head connector may convey power from the welding cables 23, 24 commonly to all of the contact tips 22 mounted within the electrode head 20. It follows that for multiple sources 40, multiple electrode head connectors may be employed that are commonly connected to the each of the contact tips 22.

Figure 7A:
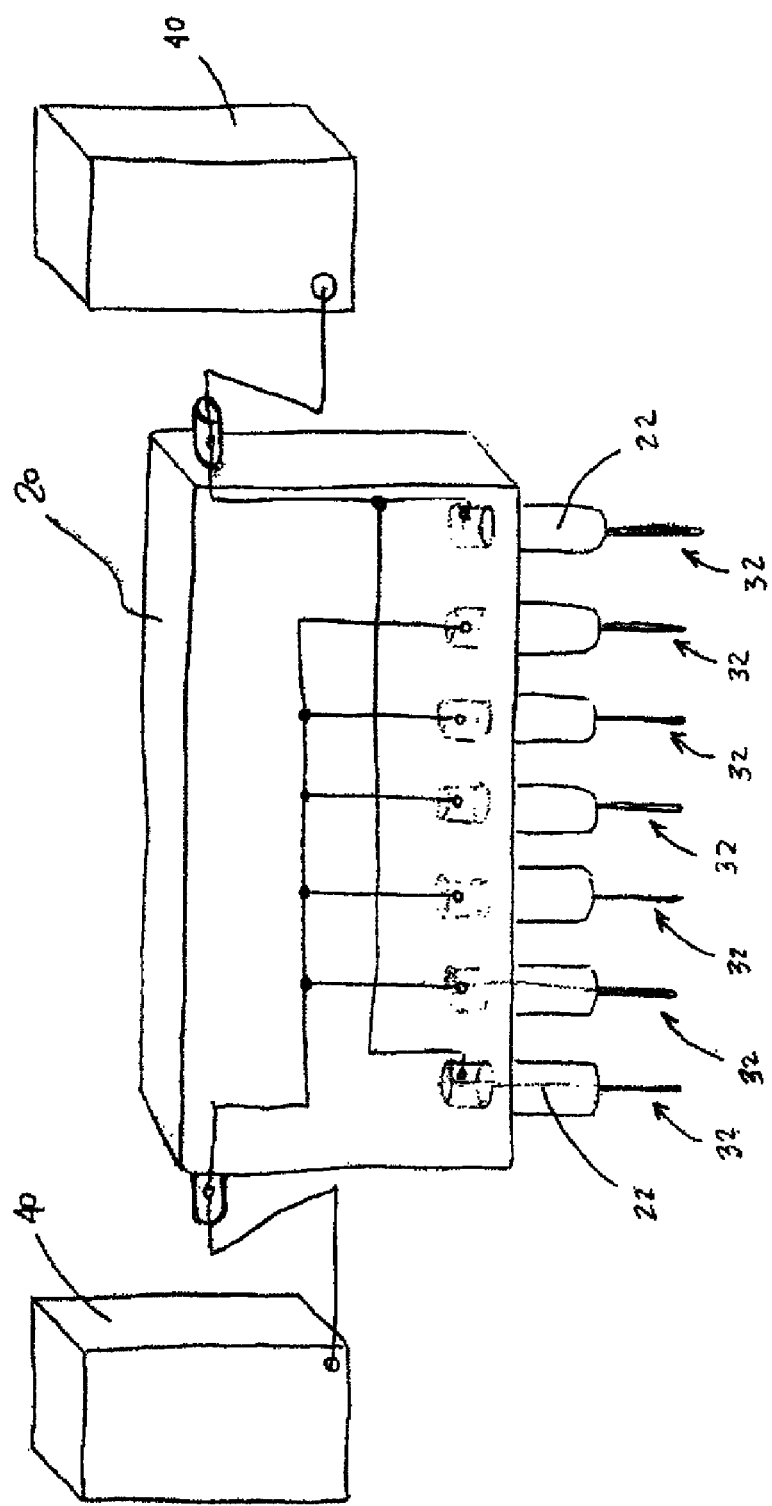
FIG. 7A is a perspective view of another embodiment of a welding device.
Figure 7B:
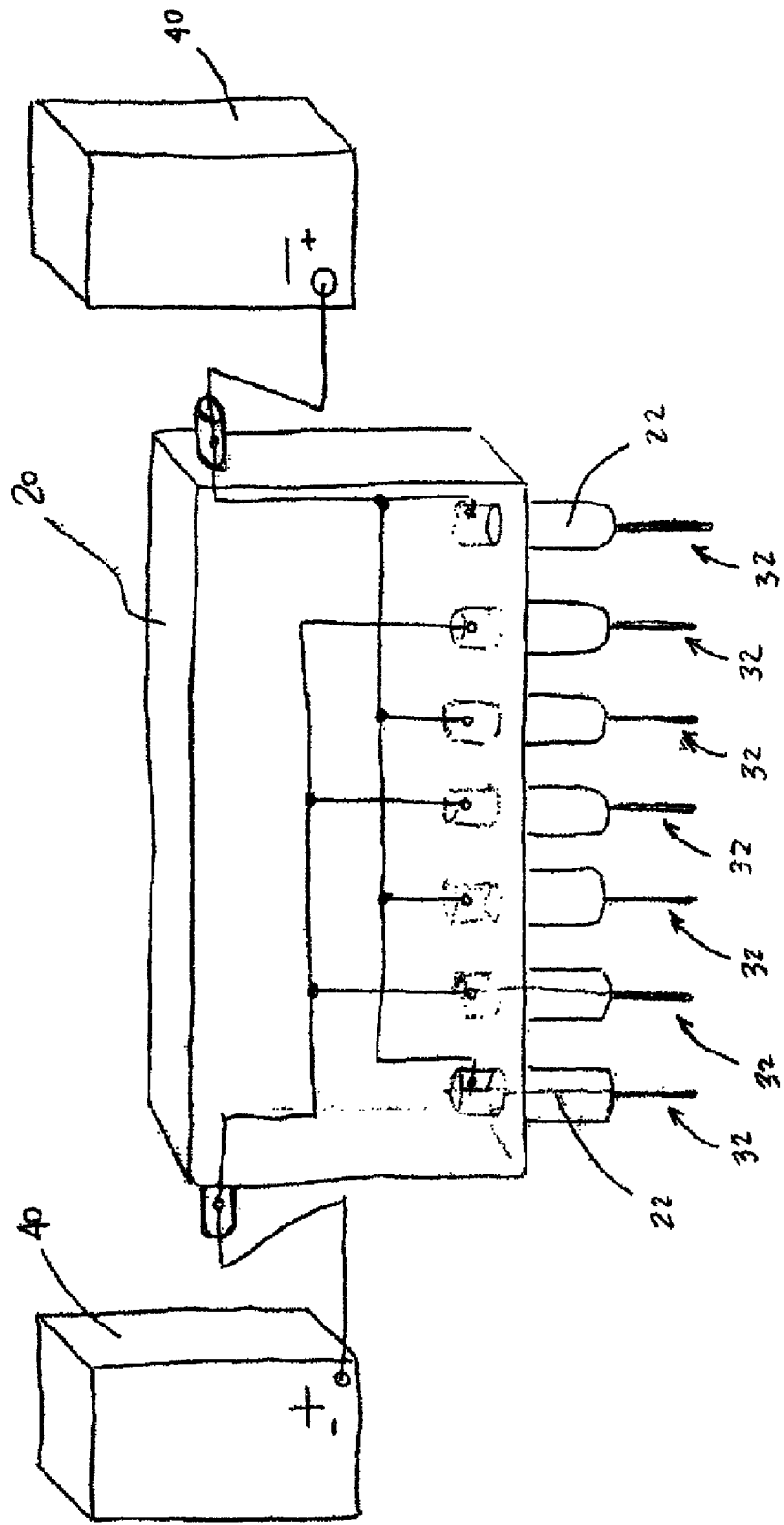
FIG. 7B is a perspective view of another embodiment of a welding device.

With reference now to FIGS. 7A and 7B, an alternate embodiment is envisioned where different contact tips 22 mounted within the electrode head 20 are connected to receive power at different voltage potentials and/or different polarities. For example, one set of electrodes 32 may be connected to a first power source 40 set at a first voltage and polarity. The remaining electrodes 32, i.e. common to the same electrode head 20, may be connected to a different power source 40' set to deliver power at a different voltage potential and polarity. In this embodiment, multiple electrode head connectors may be utilized, however the electrode head 20 may be configured such that power connections to the contact tips 22 is customized for a particular operation. For example, one power source 50 may be configured to deliver 600 amps of current to electrodes 32 arranged at the outside of array 30, while a different power source 50 may be configured to deliver a relatively lower current, for example 450 amps, to electrodes 32 arranged at the inside of array 30, so as to substantially reduce and/or eliminate the effects of the magnetic force induced by the flow of current through each electrode 32. Similarly, one power source 50 may be configured to deliver power to electrodes 32 arranged at the outside of array 30 at a negative polarity, while a different power source 50 may be configured to deliver power to electrodes 32 arranged at the inside of array 30 at a positive polarity, so as to substantially reduce and/or eliminate the effects of the magnetic force induced by the flow of current through each electrode 32. In such a configuration, the current delivered by each power source 50 may be the same or different current, depending upon the cladding operation. All such configurations are to be construed as falling with the scope of coverage of the embodiments of the subject invention.

It is noted here that in the instance where AC power is used in the welding or cladding process, it may be necessary to coordinate the waveforms generated by the respective power sources 40, 40' for substantially reducing and/or eliminating the effects of the magnetic force induced by the flow of current through the electrodes 32. In one example, power from one power source 40 may be connected to a first group of electrodes 32 (which may be the innermost electrodes 32) and power from power source 40' may be connected to a second group of electrodes 32, i.e. the outermost electrodes, within the same electrode head 20. In another example, two electrode heads 20 may be adjacently positioned for depositing material in tandem. One power source 40 may be connected to all of the electrodes 32 in the forwardmost electrode head 20 and the other power source 40' connected to the electrodes 32 of the rearward electrode head 32. In each of these instances, the AC waveforms may be synchronized such that power delivered to the electrode head 20 unbalances the magnetic forces that would otherwise divert or shift material on the surface of the workpiece or substrate. In other words, the effects of the magnetic forces on the molten fluid material are substantially reduced and/or negated. Still, it is to be construed that any manner of coordinating the waveforms, i.e. either synchronizing or de-synchronizing, may be chosen as is appropriate for use with the embodiments of the subject invention.

Figure 8:
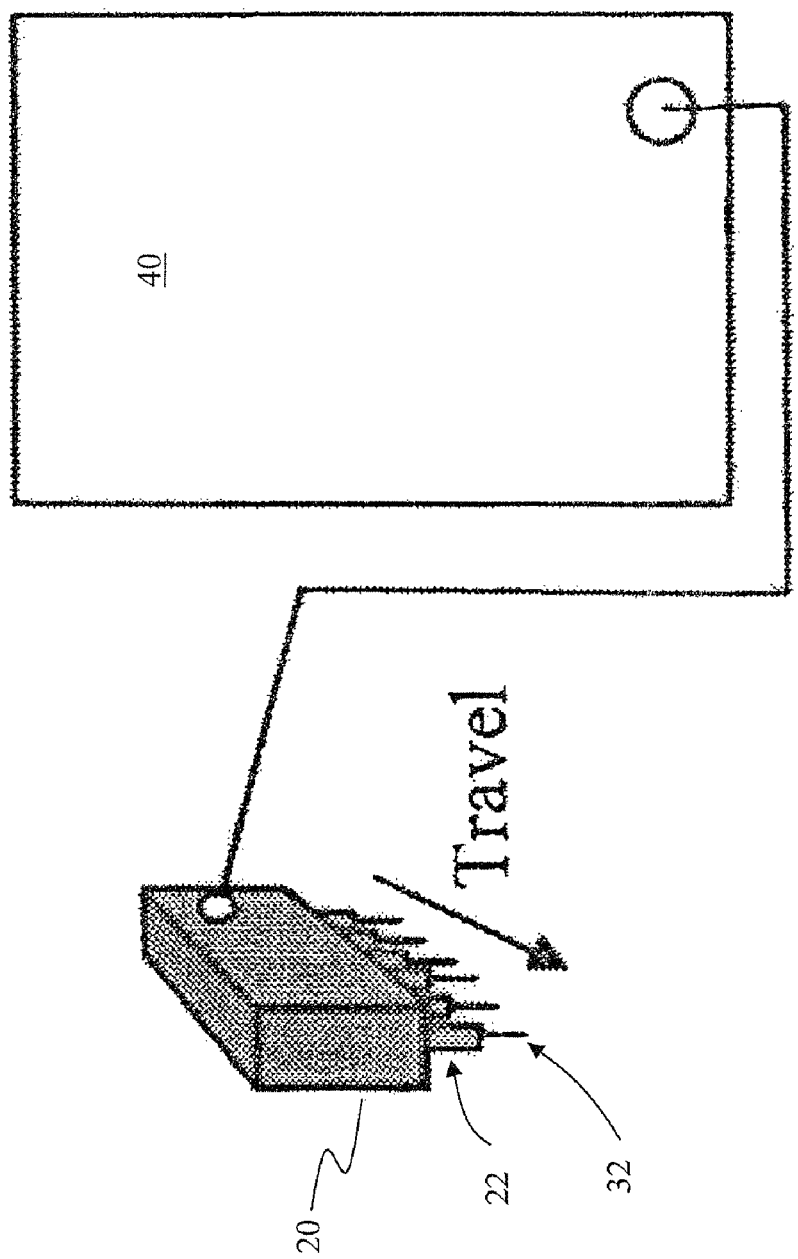
FIG. 8 is a perspective view of another embodiment of a welding device.

As shown in FIG. 1, the array 30 of electrodes 32 may be configured substantially linearly within electrode head 20, with electrode head 20 oriented perpendicularly with respect to the welding trajectory (depicted by the path of travel). As such, electrode head 20 is able to deposit a single, continuous weld bead or pool across a width of a workpiece. As shown in FIG. 8, electrode head 20 may be rotated 90° from the arrangement shown in FIG. 1. Such an arrangement may permit a relatively high rate of cladding material deposition while still maintaining low power consumption. Depending upon the number and configuration of electrodes 32 within electrode head 20, multiple cladding passes by a single electrode may be replaced by a single cladding pass performed by electrode head 20 oriented as shown in FIG. 7.

Figure 9:
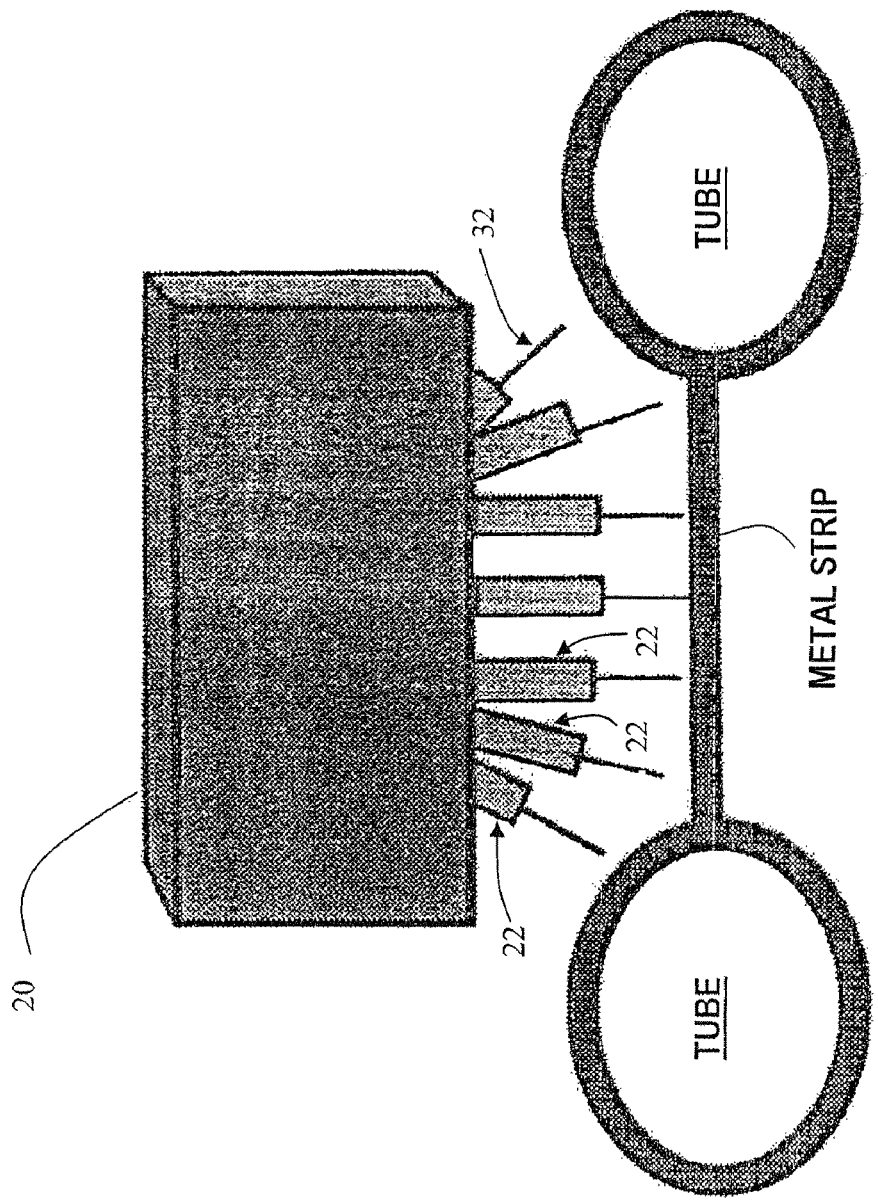
FIG. 9 is a perspective view of another embodiment of an electrode head.
Figure 10A:
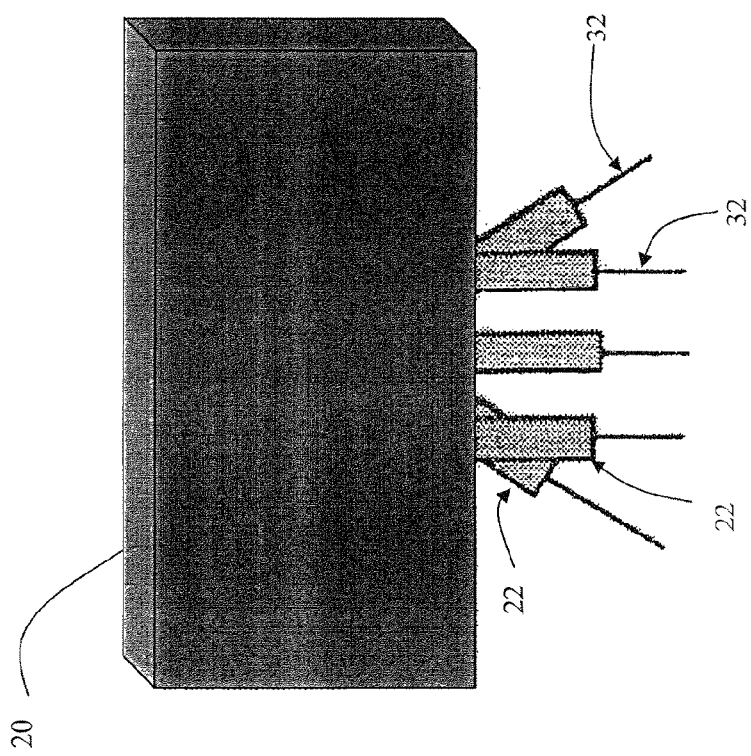
FIG. 10A is a perspective view of another embodiment of an electrode head.
Figure 10B:
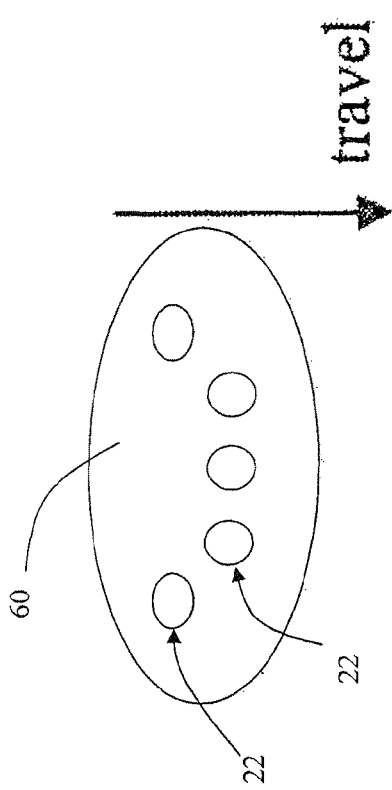
FIG. 10B is a cut-away plan view of the embodiment of the electrode head shown in FIG. 10A.
Figure 10C:
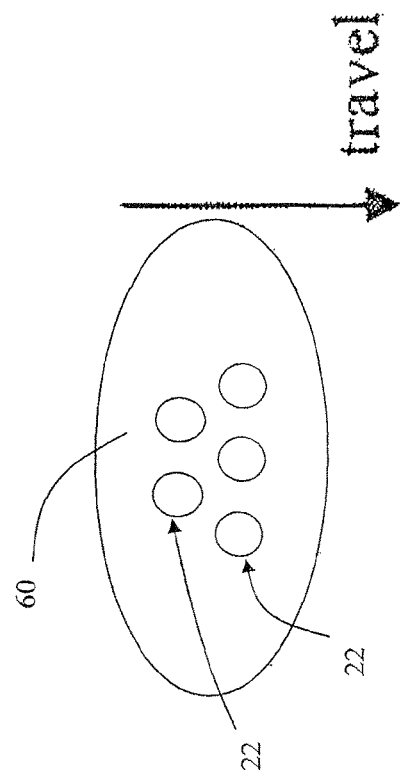
FIG. 10C is a cut-away plan view of an embodiment of an electrode head.

It is also envisioned that electrode head 20 may be configured such that contact tips 22 direct electrodes 32 at different angles of orientation relative to the workpiece. For example, it may be desirable to clad a pair of tubes connected by a strip of metal in an application known as a water wall, as shown in FIG. 9. In such an operation, electrodes 32 may be configured at angles which direct molten cladding material up the walls of the tubes of a water wall. In another alternative shown in FIGS. 10A and 10B, contact tips 22 and electrodes 32 may be configured in two rows. In this alternative, the electrodes 32 in one of the rows may be configured so as to "feather" the weld bead out or to allow the force of the arc to push the weld metal to the sides of the weld pool 60. Such an arrangement may be used to increase the amount of cladding material at the outside of the weld pool. In another alternative shown in FIG. 10C, the electrodes 32 may also be configured in two rows, such that the electrodes 32 in the trailing row (with respect to the direction of travel) deposit material which overlaps material deposited by electrodes in the leading row (with respect to the direction of travel). It is known that magnetic forces are induced by electric current flowing through electrodes 32 may result in relatively less material deposition at positions between electrodes. As such, this exemplar configuration, and other potential configurations, of electrodes 32 and contact tips 22 within the electrode head 20 may substantially reduce the effects of the induced magnetic forces.

With reference to all of the FIGS., a method of depositing cladding material is also contemplated. As shown in FIG. 11, the method 100 may include the steps of providing a welding device including an electrode head, at least a first welding power source, and a plurality of drive rolls 110, establishing a welding arc between electrodes and an associated workpiece 120, and substantially reducing the effects of a magnetic force by at least one of varying the flow of current into at least one of multiple electrodes with respect to at least another of multiple electrodes and varying the rate of speed for at least one of multiple electrodes with respect to at least another of multiple electrodes 130. The steps of method 100 are exemplary in nature, and it is anticipated that additional steps may be added to the method without departing from the spirit of the method.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A welding device for depositing material on the surface of an associated workpiece, comprising:
   an electrode head adapted to concurrently house an array of associated multiple, continuous-feed electrodes in a spaced apart configuration for concurrently depositing material on the surface of the associated workpiece, wherein said array of associated multiple, continuous feed electrodes includes an electrode near a center of said electrode head and plural electrodes located outward of said electrode near said center of said electrode head, wherein said electrodes located outward of said electrode near said center of said electrode head have a diameter greater than said electrode near said center of said electrode head; wherein the electrode head is actuatable through a welding trajectory;
   a welding power source adapted to provide power for simultaneously establishing a welding arc between each of the associated multiple, continuous-feed electrodes and the associated workpiece; and,
   means for concurrently driving the array of associated multiple, continuous-feed electrodes through the electrode head.

2. The welding device as defined in claim 1, wherein magnetic forces resulting from electrical current flowing through the associated multiple, continuous feed electrodes affects the deposition of material on the surface of the associated workpiece; and,
   wherein the electrode head is configured to house the array of associated multiple, continuous-feed electrodes in a positional arrangement that reduces the effects the magnetic forces upon material deposition.

3. The welding device as defined in claim 2, wherein the electrode head includes a plurality of apertures adapted to receive the associated multiple, continuous-feed electrodes; and,
   wherein the apertures are positionally arranged in a nonlinear configuration.

4. The welding device as defined in claim 2, wherein the electrode head is configured to house the array of associated multiple, continuous-feed electrodes in a positional arrangement that overlaps the deposition of material on the associated workpiece with respect to the welding trajectory.

5. The welding device as defined in claim 2, wherein the electrode head is configured to house the array of associated multiple, continuous-feed electrodes in a positional arrangement that is least partially V-shaped.

6. The welding device as defined in claim 1, wherein the electrode head is adapted to house associated multiple, continuous-feed electrodes having a diameter within the range between 0.020 inch to 0.060 inch.

7. The welding device as defined in claim 6, wherein each of the associated multiple, continuous-feed electrodes in the array are connected to the same voltage potential.

8. The welding device as defined in claim 6, wherein the array of associated multiple, continuous-feed electrodes are substantially, linearly arranged within the electrode head.

9. The welding device as defined in claim 6, wherein each of the associated multiple, continuous-feed electrodes in the array are driven through the electrode head at substantially the same rate.

10. The welding device as defined in claim 1, wherein said means for concurrently driving the array comprises a plurality of drive rolls, each of the plurality of drive rolls associated with at least one of the associated multiple, continuous-feed electrodes.

11. The welding device as defined in claim 1, wherein said electrode near said center of said electrode head has a diameter in a range of 0.020 inch to 0.035 inch and said plural electrodes located outward of said electrode near said center of said electrode head have a diameter of 0.045 inch.

12. The welding device as defined in claim 1, wherein the electrode head is adapted to concurrently house associated multiple, continuous feed electrodes having different angles of orientation with respect to the workpiece.

13. The welding device as defined in claim 1, wherein the electrode head is adapted to receive a plurality of electrode contact tips, each of the plurality of contact tips associated with one of the associated multiple, continuous-feed electrodes.

14. The welding device as defined in claim 13, wherein the plurality of contact tips respectively include tip ends, and,
    wherein at least one of the plurality of contact tips are selectively positionable within the electrode head for varying the distance between the tip ends and the associated workpiece.

15. The welding device as defined in claim 13, wherein the plurality of contact tips include contact tips having different lengths.

* * * * *